Nov. 1, 1966  P. C. DIMITRACOPOULOS ET AL  3,282,154
AUDIOVISUAL PROJECTION SYSTEM
Original Filed July 3, 1961

P.C. DIMITRACOPOULOS &
C.D. PEZARIS
INVENTORS

BY Homer R. Montague
ATTORNEY

P.C. DIMITRACOPOULOS &
C.D. PEZARIS
INVENTORS 3,282,154
AUDIOVISUAL PROJECTION SYSTEM
Panayotis C. Dimitracopoulos, 2162 Sherbrooke St. W., and Constantine D. Pezaris, 2240 Lavallee St., both of Montreal, Quebec, Canada
Original application July 3, 1961, Ser. No. 121,734, now Patent No. 3,122,054, dated Feb. 25, 1964. Divided and this application Nov. 27, 1963, Ser. No. 326,620
2 Claims. (Cl. 88—28)

This application is a division of Serial No. 121,734 filed July 3, 1961, now Patent No. 3,122,054, which was in part a continuation of Serial No. 811,083 filed May 5, 1959, now Patent No. 3,122,053.

This invention has to do with audiovisual projection systems, and in particular to systems of this kind in which individual slide elements or units incorporate both a projectable optical representation or image, either as a monochrome or color projection positive, and a sound record in the form of a spiral sound track, groove or the like. In addition, the invention provides improved special forms of audiovisual slides or projection units, adapted for either small-scale or individual preparation of the units, or the mass reproduction thereof, to satisfy the needs of a variety of particular applications.

The invention will be described herein by reference to certain presently preferred specific embodiments thereof, with regard to the construction of the information units (slides). However, it will be understood by those skilled in the art that the principles of the invention can be carried out by specifically different physical devices, both as to the nature of the information records and the projection equipment; and that in using words of limited meaning for the better understanding of the particulars of the forms chosen for description and illustration, it is not intended to exclude variations of those details which properly fall within the scope of the invention in its broader aspects.

Photographic slides have become a popular and acceptable medium for the display of visual information, since they are relatively simple and inexpensive to prepare, both individually and as quantity reproductions, and can be projected to any desired enlargement with good definition and excellent color rendition. Their use in education, entertainment, industrial training, advertising and similar fields is commonplace. Efforts to provide a system in which the projection of individual slides is accompanied by "synchronized" sound information have met with great difficulty, for reasons familiar to those working in this field. The usual prior approach has been the use of separate projectors and phonographs or tape reproducers, sometimes assembled in a single housing. Since separate media carry the picture and sound, automatic synchronization or complete integration of sound and picture was practically impossible.

The present invention solves the difficulty by directly and permanently associating a generous length of recorded sound (audio) information with each visually-projectable image or visual slide unit, in such a way that a properly designed projector can simultaneously reproduce both the audio and visual records of a slide unit, individually or sequentially, without any special requirement as to synchronization, the latter following inevitably from the fact of integration of the two kinds of records upon a single record unit. The combination permits the use of sound recording and reproducing techniques adapted either to the making of individual records, for limited use or special distribution, or to the economical mass production of duplicate information records for more widespread application. Moreover, the utilization of series of individual records of this kind permits easy up-dating, editorial revision or correction, or alteration of particular parts only of a sequence, and the assembly of a variety of sequences to accomplish particular objects.

In brief, the invention provides a system of the above kind in which the individual audiovisual slides consist of an optical transparency, such as a projection positive film or the like, of standard size and format, carried directly upon, or forming a part of, a sound record which preferably is of the spiral groove type for ready reproduction by a simple form of phonographic reproducer. In particular, the audiovisual record unit is employed with a reproducer of special construction and attributes, as described in the parent applications above, that permits the record unit itself to be held stationary, while the reproducer for the sound track is rotated to achieve the necessary relative motion involved in sensing and reproducing the sound information. The satisfactory accomplishment of this combination yields important advantages for the system as a whole, among which are the elimination of requirements for expensive types of record units (such as those requiring moving parts in each unit), the relaxation of manufacturing tolerances and requirements normally associated with other audiovisual systems of comparable or inferior performance characteristics, the ease and low cost of preparing record units of even the highest quality, and others.

The invention will now be described in some detail in connection with the specific chosen embodiments thereof, reference being made to the accompanying drawings, in which.

The audiovisual slides in accordance with the invention are basically constituted as single integrated units, each of which incorporates (a) an optical, usually photographic, image record for viewing or projection, and (b) a related sound track, groove or other audio or signal control record. Depending upon the kind of system or application for which they are intended, the actual physical structures may be widely varied without departing from the underlying principles. Thus, for high-volume production of an audiovisual slide, carrying particular subject-matter, it is feasible to combine a mass-produced optical record (such as a diapositive color image) and a mass-produced sound record (such as a sound groove of the pressed type) on a single record sheet of suitable properties. This single record sheet may be of a relatively thin and flexible nature, and laminated upon a stiffer support, or it may be sufficiently rigid and tough so that a separate support is not required. On the other hand, and especially for the production of single copies, or only a few copies, the optical record may be an individual photographic reproduction on diapositive film, mounted or unmounted, with provisions for its convenient association with the sound record, which may now take the form of an embossed groove, a magnetic record with or without a reproducer-guiding groove, or the like. This sound record may be formed upon or applied to a suitable support of such properties that it will form the main body of the finished audiovisual slide when the visual record has been inserted or secured thereto.

Figure 1:
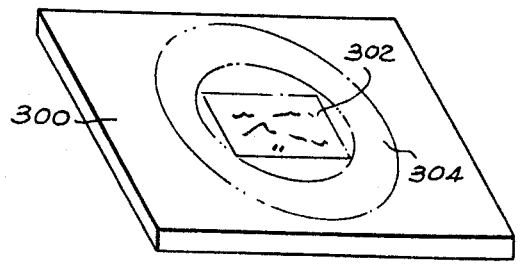
FIGURE 1 is a perspective view of an embodiment of an audiovisual slide according to the invention.

FIG. 1 is a perspective view of a typical audiovisual slide 300 in accordance with the invention, for example of rectangular shape, provided substantially at its central portion with a transparency 302 carrying the visual information to be projected, and also with a sound track 304 carrying the audio information to be reproduced. The sound track 304 consists, for example, of a spiral phonographic groove, said groove surrounding the transparency 302 and being centered so that the axis of the grooves substantially coincides with the center of the transparency.

Figure 2:
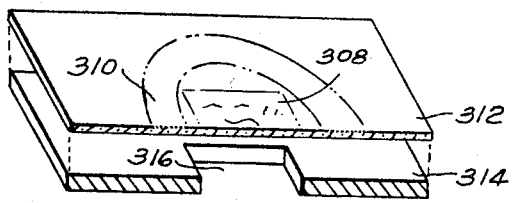
FIGURE 2 is an exploded perspective view, in section, of another embodiment of the slide construction.

FIG. 2 illustrates by an exploded, sectional perspective view, an exemplary form of construction of the slide. Both the visual information 308 and the sound track 310 are carried on the same plate 312 which may be transparent throughout, or may be transparent only at its transparency portion. The transparency and sound track may be carried on the same side of plate 312, or one may lie on one side and the other on the other side.

If plate 312 is rigid, no further support is necessary. However, if plate 312 is not sufficiently thick or rigid, a plastic, cardboard or metallic backing such as indicated at 314 may be necessary. Such backing is then provided with an opening at 316 facing the transparency, to permit the light rays to reach it. The plate 312 and its backing are cemented together, or otherwise connected, so that the finished audiovisual slide has the general appearance illustrated in FIG. 1.

Figure 3:
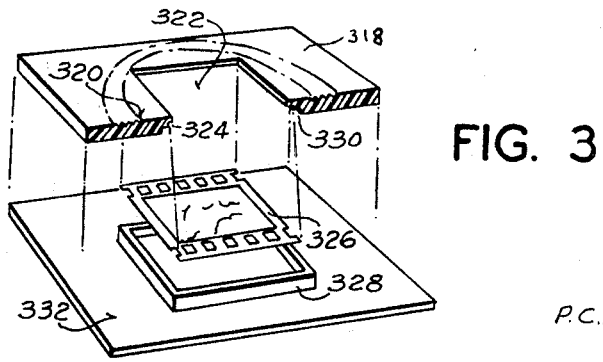
FIGURE 3 is an exploded perspective view, partly sectioned, showing the construction of a further form of slide.

FIG. 3 is an exploded, partly sectional view of an alternative form of the audiovisual slide, especially adapted for the use of rectangular photographic films as the transparency. Plate 318 carries the sound track 320 and has a substantially rectangular opening 322, formed with a two-step recess. Into the first step 324 fits a photographic transparency 326, which is prevented from falling out by a frame 328 which fits into the second step 330. An apertured paper or plastic sheet 332 is cemented on both plate 318 and frame 328, so that the finished audiovisual slide again looks substantially like FIG. 1. Alternatively, sheet 332 may be omitted, in which case frame 328 is directly cemented or otherwise held on plate 318.

Figure 4:
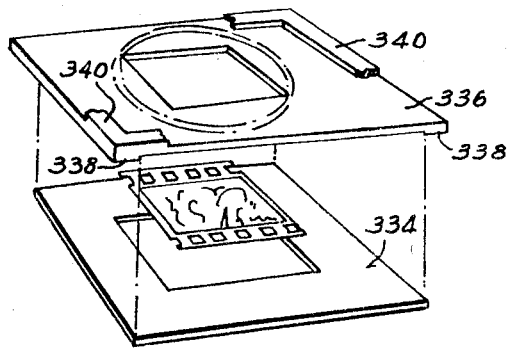
FIGURE 4 is a similar view of a modified arrangement of the slide.

FIG. 4 is another alternative form of the audiovisual slide, very like the one illustrated in FIG. 3 and described above, but without the frame-like member 328. The paper or plastic sheet 334 is also optional; in any event, the plate 336 (corresponding to 318 of FIG. 3) is formed with at least two of its edges thicker than the remainder of the plate, as indicated at 338, to protect the transparency. In order to protect the sound track also, thicker edges may also be formed on the sound-track carrying surface of plate 336, as indicated at 340.

Figure 5:
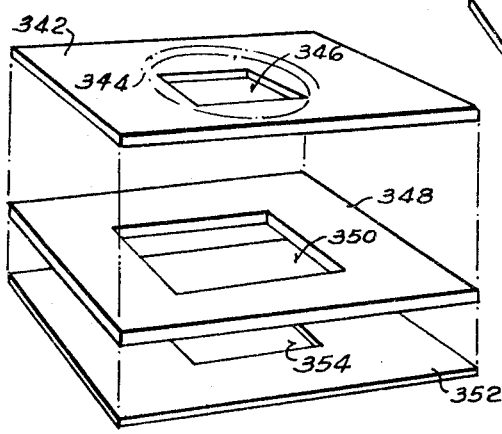
FIGURE 5 is a similar view of another modified slide construction.

FIG. 5 is still another alternative form of the audiovisual slide. Plate 342 carries the sound track 344 and has a substantially rectangular opening 346. Intermediate plate 348 has also a rectangular opening 350 substantially in registry with opening 346, but larger. Finally, sheet or plate 352 also has an opening (354) in registry with, and substantially as large as, opening 346. A photographic transparency (not shown) unmounted or mounted on a frame, for example, as is well known in the art of 35 mm. photography, may be placed in the opening 350 of plate 348, and plates 342, 348 and 352 are then cemented or otherwise held together to form an audiovisual slide that is substantially the same as the one illustrated in FIG. 1. Thus, the photographic transparency is "sandwiched" between layers 342 and 352, and held in registry by the layer 348. Alternatively, layer 352 can be omitted, in which case the transparency, preferably mounted, may be cemented or otherwise held directly upon plate 342 or plate 348. Plate 342 may, if desired, be itself formed by laminating a thin plastic sound track carrying sheet onto a cardboard, paper, plastic or metal sheet.

Figure 7:
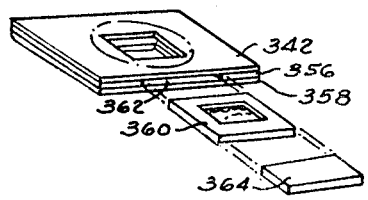
FIGURE 7 is an exploded view explanatory of the assembly of a slide in accordance with the showing of FIG. 6.
Figure 6:
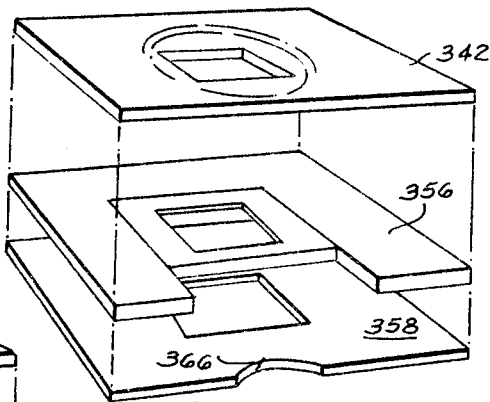
FIGURE 6 is again a similar view of a further modification of the slide.

FIG. 6 is still another alternative form of the audiovisual slide, very similar to the one illustrated in FIG. 5, the difference being that the intermediate layer 356 is U-shaped. When the layers 342, 356 and 358 have been laminated together, as shown in FIG. 7, a photographic transparency 360, for example, a 35 mm. transparency mounted on a standard 2 inch by 2 inch frame, may be inserted or withdrawn through opening 362, and an optional plug 364 may be used to hold it in place. Layer or plate 358 may have an edge notch or cut-out 366 to facilitate withdrawal of the plug 364 and the transparency 360.

Figure 8:
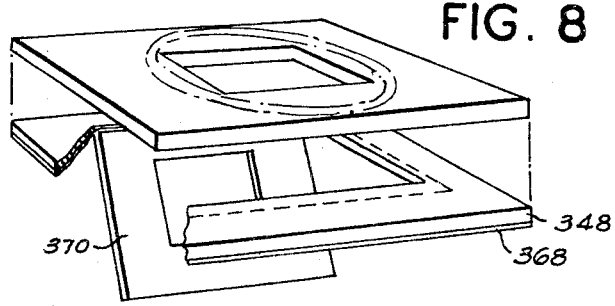
FIGURE 8 is an exploded, partly broken-away view of a further form of slide construction.

FIG. 8 is still another alternative form of the audiovisual slide, similar to the one in FIG. 5, but the layer 368 (corresponding to layer 352 of FIG. 5) is now formed with a cut-off or hinged flap 370. This flap is lifted, and a preferably mounted transparency, not shown, is inserted and held in registry by the intermediate layer 348 identical with that shown in FIG. 5. The flap 370 is then pressed or cemented against the intermediate layer 348, so that the finished audiovisual slide has substantially the same form and appearance as FIG. 1.

Figure 9:
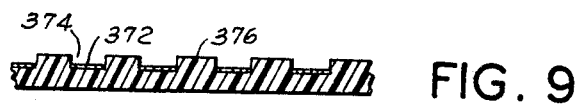
FIGURE 9 is an enlarged sectional view of a portion of a sound record usable with the invention.

The foregoing descriptions of typical forms of audiovisual slides have dealt implicitly with sound records in the form of phonographic grooves, actually the record may be of other desired types, such as a magnetic sound record or in optical or photographic sound record as commonly used in the motion picture industry. When either magnetic or photographic sound tracks of spiral form are employed, it is convenient to provide a guiding groove at or adjacent to the spiral sound track to guide the reproducer head. Such a modified sound record is illustrated in FIG. 9, which is an enlarged cross sectional view of a portion of a sound record layer. Here, the sound track 372 is shown as provided at the bottom surface of a spiral groove 374 formed in the sound record layer 376. The reproducer head can then be guided physically with respect to the sound track spiral. Obviously, a mechanical guiding groove could equally well be formed in the layer 376 to one side of the sound record; that is, with the guide grooves interspersed with the spiral turns of the sound track. Other variations of this type will readily occur to those skilled in the art of sound recording.

In using the term "sound record," it is not intended to exclude the use of signals of subsonic and supersonic frequencies capable of carrying sound information, or other information such as control signals or the like. The term "sound pickup" or the like is likewise intended to cover all types of mechanical, optical or magnetic transducers suitable for the purpose.

What is claimed is:
1. A unitary combined sound and picture-projection slide comprising a relatively flat rectangular support plate carrying on one face thereof a stationary open-spiral sound track whose radial width is small compared with the outer diameter of said track, said plate having a rec- tangular aperture defined by stepped-edge walls and being positioned wholly within the inner diameter of said sound track, a rectangular projection diapositive having major dimensions slightly larger than those of said aperture and being positioned in registered relation to said aperture within the recess provided by said stepped walls, frame means received in said recess in engagement with said diapositive for holding the latter fixed in centered position relative to said aperture, and means for securing said frame means to said plate.

2. A slide according to claim 1, in which the walls of said aperture are doubly-stepped, said diapositive being fitted within the smaller step portion and said frame being fitted within the larger step portion.

References Cited by the Examiner
UNITED STATES PATENTS 2,961,922   11/1960   Schwartz et al. _____ 88—28

NORTON ANSHER, *Primary Examiner.*

V. A. SMITH, *Assistant Examiner.*